UNITED STATES PATENT OFFICE.

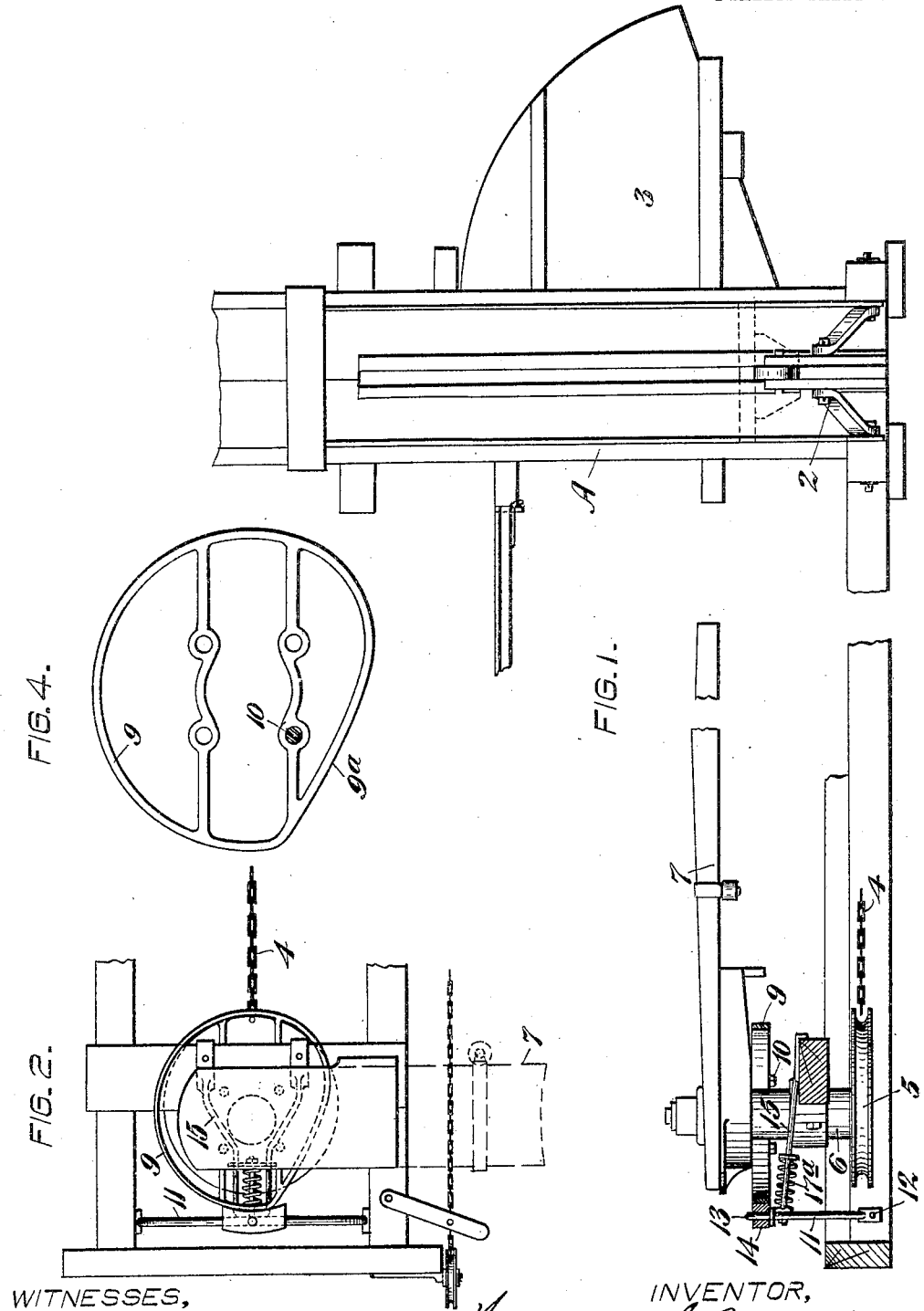

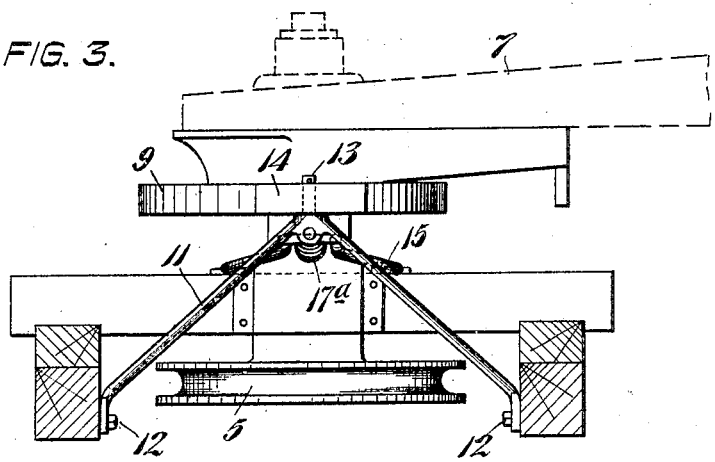
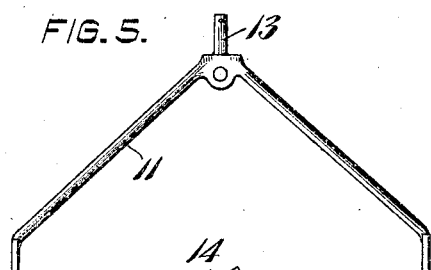
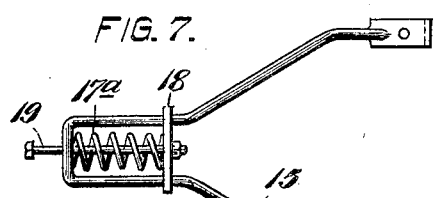
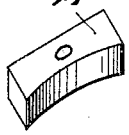
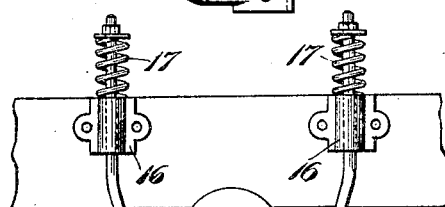
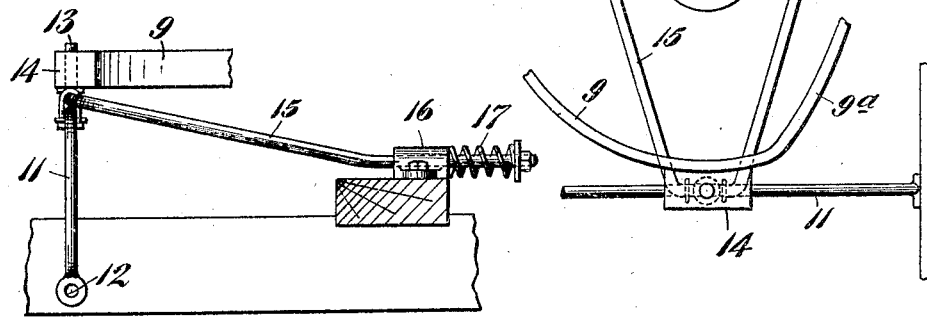

WILLIAM S. BRADSHAW, OF SAN JOSE, CALIFORNIA.

BALING-PRESS BRAKE.

No. 810,102.          Specification of Letters Patent.          Patented Jan. 16, 1906.

Application filed December 6, 1904. Serial No. 235,675.

*To all whom it may concern:*

Be it known that I, WILLIAM S. BRADSHAW, a citizen of the United States, residing at San Jose, in the county of Santa Clara and State of California, have invented new and useful Improvements in Baling-Press Brakes, of which the following is a specification.

My invention relates to a brake which is especially designed for use upon baling-presses and for the purpose of letting the follower down easily when the power has been released.

It consists in the combination and arrangement of parts and mechanism whereby the brake may be located beneath the sweep and is rendered automatic.

It also comprises details of construction which will be more fully explained by reference to the accompanying drawings, in which—

Figure 1 is a side elevation of a baling-press, showing the application of my brake. Fig. 2 is a top plan view of power end. Fig. 3 is an end elevation of same. Fig. 4 is a plan view of brake-band. Fig. 5 is a view of brake-block frame. Fig. 6 is a perspective of brake-block. Fig. 7 illustrates a modified form of horizontal spring-frame. Figs. 8 and 9 illustrate side and plan views of the yoke and its adjuncts.

In the operation of baling-presses which press the bale upwardly and where charges of material to be pressed are introduced through a chute and door in the lower part of the vertical press-body and are successively compressed by means of a follower which is raised within the press-body, power to raise this follower is applied through a sweep driven by animal power or by other suitable power, and this sweep is released at a certain point, thus allowing the follower to be returned to the bottom. The weight of the follower and its attachments is considerable, and it is desirable to apply a brake so that upon the return of the parts actuated by the sweep the return movement will be controlled and the follower will be let down easily.

It is the object of my invention to provide an automatically-operating brake for this purpose which is located beneath the sweep.

As shown in the drawings, A represents a vertical press, within which a follower is operated by lever arms and connections, as at 2, so that when charges of material to be pressed have been introduced through an inclosed chute or hopper 3 and the door afterward closed the follower is raised, lifting and compressing the hay into the upper part of the press. This portion of the apparatus being well known needs no further description. The movement of the follower and the compression of the material are effected by a chain, as at 4, which connects the follower-actuating mechanism with a pulley 5, fixed upon a vertical shaft or column 6, by the rotation of which the chain is caused to actuate the follower. This rotation is effected by means of a sweep at 7, which engages an arm fixed to the column 6, and thus turns the column and pulley a certain distance to raise the follower, at the end of which movement the sweep is released from the arm by a trip mechanism and the column and pulley are allowed to revolve backwardly and allow the follower to drop.

The portion thus far described is common to this class of presses, and it is the object of my invention to apply an automatic brake, which is constructed as follows:

9 is a cam-shaped ring or band which is fixed to the sweep-casting by bolts, as shown at 10, so that the band is revolved in unison with the movements of the sweep.

11 is an A-shaped yoke, the lower ends of which are pivoted to the inner sides of the power-frame timbers, as shown at 12, and the upper end of the yoke has a spindle, as at 13, which is adapted to carry the brake-block 14, so that the latter swivels freely upon the spindle. As the yoke 11 is swiveled at the bottom, it will be seen that the upper end is movable to and from the periphery of the cam-shaped band 9.

A horizontal yoke 15 has its apex connected with the upper end of the swinging yoke 11, and its opposite or forked ends may be slidable in guides upon the frame, as shown at 16. Spiral springs 17 inclose the projecting ends of the yoke and act to draw it in such a way as to pull the upper end of the yoke 11 and the brake toward the rim or band 9. An equivalent mechanism may be produced by bolting the ends of the yoke 15 and forming the outer ends so as to guide the slidable plate, as at 18, Fig. 7. Connected with this plate is a bolt 19, surrounded by a spiral spring 17ª, and this bolt connects, as before described, with the upper end of the yoke 11, so that the tension of the spring 17ª will act in the manner previously described to hold the brake-block against the rim or band 9. This band beside being cam-shaped is also fixed, so that its outer and substantially circular curved surface is eccentric to the column upon which it is fixed.

When the sweep has been turned to a point which has raised the follower within the press-box, the brake-block 14 will rest against the circular portion of the rim or band at a point least distant from the column 6, and when the sweep is released, so that the pulley 5 turns backward and through the chain allows the follower to drop, the increasing diameter of the band 9, passing the brake-block, and the action of the spring 17 will cause the brake to act with continually-increasing force until when the follower has reached its lowest position the friction will have so reduced the movement of said follower as to allow it to fall gently to the bottom. In order to prevent the brake-block from turning around and getting out of position while the cam completes its revolution, the rim or band 9 has a flattened portion, as at 9ª, connecting the greatest and least diameter of the circular braking portion. This flattened portion 9ª passes the brake-block without any especial effect except to prevent the brake-block from turning while passing over this portion and to its initial starting-point.

By this construction it will be seen that the brake is located entirely beneath the sweep and out of the way, and its operation will be automatic and effective at each release of the sweep from the follower-actuating mechanism.

It will be understood that the spindle which carries the brake-block may be attached to or form a part of the yoke 15 or it may be carried by any connected part in such a manner as to hold the brake-block substantially square against the face of the cam, and such modifications or adjustments are within the scope of my invention.

Having thus described my invention, what I claim, and desire to secure by Letters Patent, is—

1. The combination with a vertical baling-press, the follower-actuating mechanism thereof and a power-sweep, of a vertical column to which the sweep is fixed and through which the follower-actuating mechanism is operated, a member movable in unison with the column, a brake-shoe, and means for holding said shoe yieldingly in contact with said member for retarding the downward movement of the follower after the release of the sweep.

2. A baling-press having a vertically-movable follower, a vertical column, connections between the column and the follower for raising the latter to compress charges within the press-box, means whereby the column may be rotated, a friction member carried by the column, and a brake-shoe and means whereby it is held in contact with said friction member by an elastic pressure whereby the downward movement of the follower is retarded.

3. In a baling-press, a power mechanism, including a vertical column with a chain-pulley, and a sweep, an eccentric rim fixed to and revoluble with the column, a brake-shoe, a yielding support upon which the shoe is carried, and means by which the brake-shoe is held in contact with the rim by an elastic pressure.

4. A brake mechanism for baling-presses, comprising a follower, a power-sweep, intermediate mechanism through which power is transmitted to raise the follower, and a brake whereby the return movement of the follower is controlled, said brake consisting of an eccentrically-mounted rim, a shoe contacting with said rim, and means for applying pressure to said shoe.

5. A brake mechanism for baling-presses, comprising a follower, a power-sweep, intermediate mechanism through which power is transmitted to raise the follower, and a brake whereby the return movement of the follower is controlled, said brake consisting of a shoe, a swiveled yoke upon which the shoe is mounted, a rim eccentrically mounted upon the sweep-column, and means for applying pressure to force the shoe against the rim.

In testimony whereof I have hereunto set my hand in presence of two subscribing witnesses.

WILLIAM S. BRADSHAW.

Witnesses:
W. H. CHRISTMAS,
J. P. NEIL.